H. ZINS.
TIMER.
APPLICATION FILED APR. 19, 1920.
1,369,072.  Patented Feb. 22, 1921.
2 SHEETS—SHEET 1.
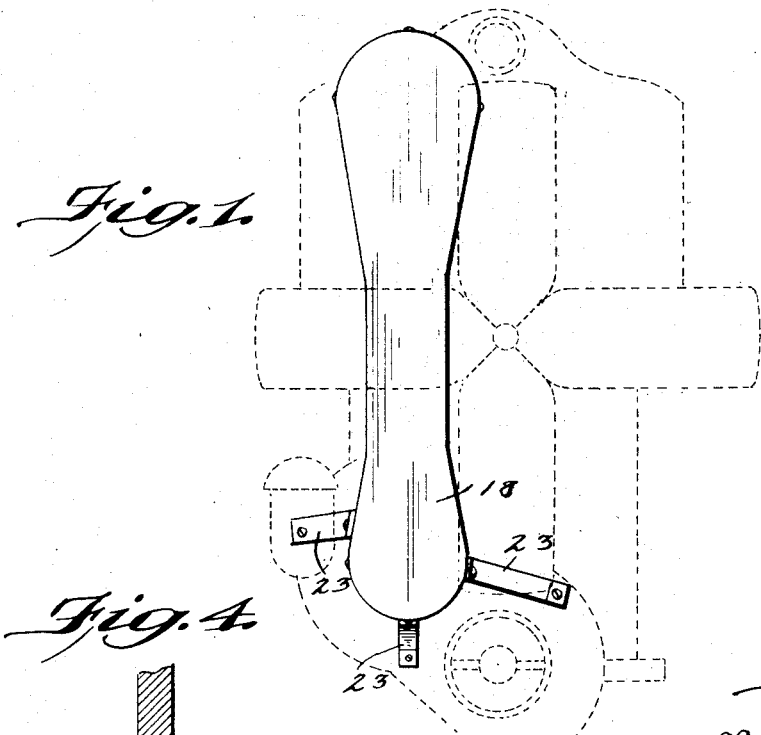
Fig. 1.
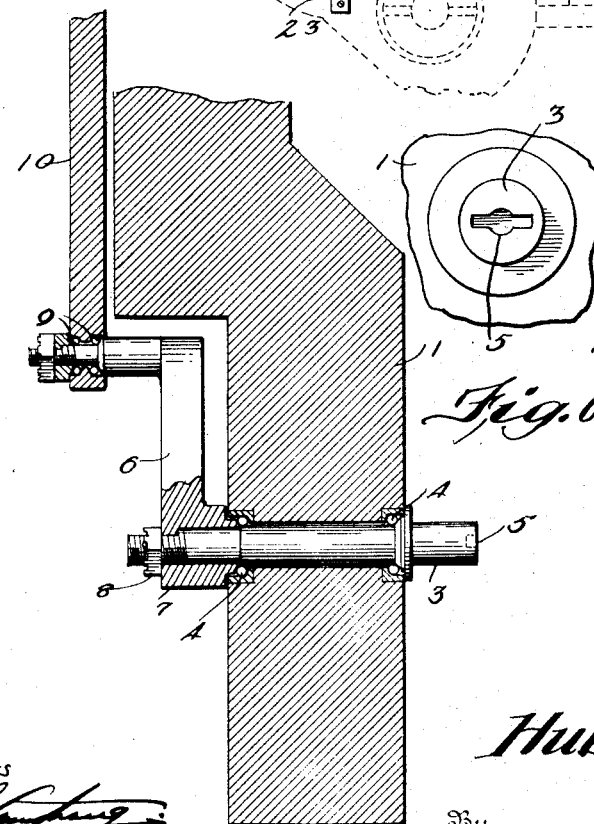
Fig. 4.
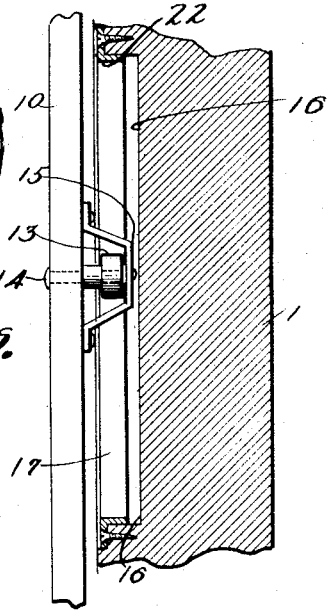
Fig. 5.
Fig. 6.
Witness
Inventor
Hubert Zins,
By
Attorney

H. ZINS.
TIMER.
APPLICATION FILED APR. 19, 1920.

1,369,072.

Patented Feb. 22, 1921.
2 SHEETS—SHEET 2.

Inventor
Hubert Zins,

By

Attorney

Witness

UNITED STATES PATENT OFFICE.

HUBERT ZINS, OF WABASSO, MINNESOTA.

TIMER.

1,369,072. Specification of Letters Patent. Patented Feb. 22, 1921.

Application filed April 19, 1920. Serial No. 375,015.

*To all whom it may concern:*

Be it known that I, HUBERT ZINS, a citizen of the United States, and a resident of Wabasso, in the county of Redwood and State of Minnesota, have invented certain new and useful Improvements in Timers, of which the following is a specification.

My invention is an improvement in timers, and has for its object to provide mechanism for use in connection with timers of internal combustion engines, for permitting the timer to be arranged above the engine in convenient position for inspection, while at the same time providing the proper drive connection between the timer and the timer shaft.

In the drawings:

Figure 1 is a front view of the improved timer;

Fig. 4 is an enlarged sectional detail through the head end of the timer;

Fig. 5 is an enlarged sectional detail at the roller;

Fig. 6 is an end view of the timer shaft.

Figure 2:
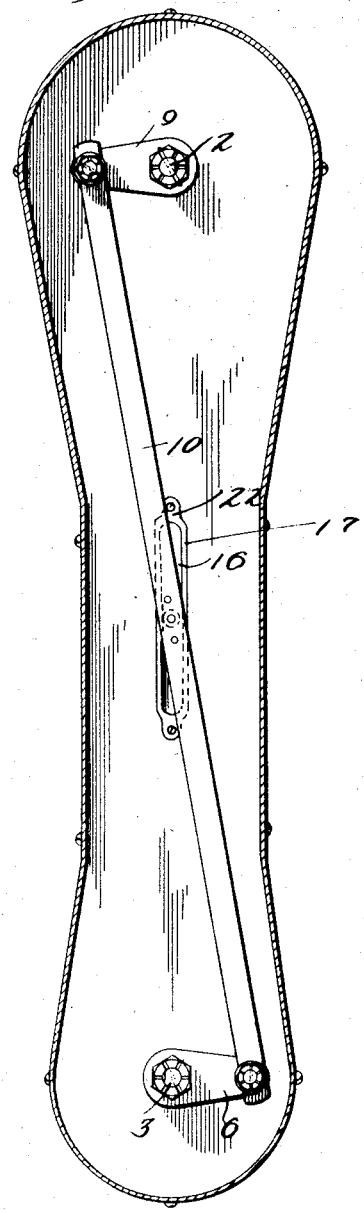
Fig. 2 is a vertical section.

In the present embodiment of the invention a suitable supporting base plate 1 is provided, of wood or the like, and in each end of this plate there is journaled a shaft 2 and 3, respectively, all of these shafts being journaled loosely in openings in the plate 1, and ball bearings indicated at 4 in Fig. 4, are provided for each shaft, only those bearings on the shaft 3 being shown.

The shaft 3 has a socket provided with a keyway, indicated at 5, for engaging the usual shaft which protrudes through the front of the engine in the usual manner, and the shaft 3 is driven by this time shaft. It will be understood that the time shaft has oppositely arranged keys, which engage the keyways of the socket.

A crank 6 is held on the opposite end of the shaft 3 from the socket, the said crank having a hub 7 threaded on to a reduced portion of the shaft and held in place by a lock nut 8. The shaft 2 also has a crank 9 which is mounted on the shaft in the same manner as the crank 6, and these cranks are connected by a link 10.

Figure 3:
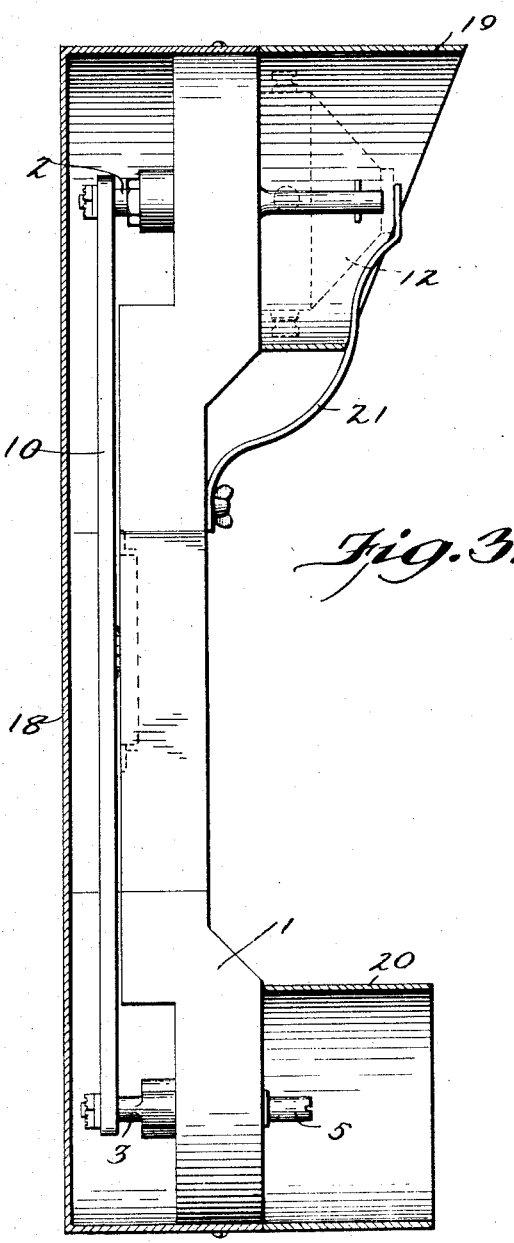
Fig. 3 is a similar view at right angles to Fig. 2.

Ball bearings, indicated at 9, are arranged between each end of the link and the adjacent crank, and the shaft 2 is connected with the brush of the timer, indicated generally at 12 in Fig. 3. A roller 13 is mounted on a journal pin 14 which is secured to the link 10 at its center, and the journal pin is held on the opposite side of the roller from the link by a substantially U-shaped bracket 15 which is secured to the link.

The roller moves in a slot or passage 16 in the plate 2, engaging the side wall of the passage, and it will be obvious that when the shaft 3 is rotated the shaft 2 will be rotated, but in the opposite direction, the link 10 and the roller 13 providing a reversing mechanism.

Rails 17 are arranged on opposite sides of the slot 16 and the roller 13 moves in engagement with these rails. Referring to Fig. 2, when the crank 6 moves upwardly, the crank 9 will also move upwardly, but it is on the opposite side of the shaft 2, and as the crank 6 moves over the shaft 3 from right to left the crank 9 will move over the shaft 2 from left to right. Thus the timer brush will be driven in the proper direction from the timer shaft, but the connection shown permits the timer to be mounted above the engine and laterally, to escape interference with any and all parts of the mechanism of the engine.

This arrangement of the timer also removes it from the vicinity of the oil, and it may be kept in better condition, freer from dirt and grease. In addition, the wiring may be run over the top of the engine and it is not necessary to bring the wiring down in front of the engine as in the usual arrangement. As is known, grease and oils on the connecting wires cause ignition troubles, such as pre-ignition or lack of ignition, and these troubles are eliminated by removing the timer to a point where it will not be subject to contact with the oil.

A suitable inclosing hood 18 is provided for the mechanism, the hood having tubular extensions 19 and 20 at its ends for inclosing the timer shaft and the timer. In case of timer troubles this hood may be easily removed and the timer is in convenient position for inspection.

Referring to Fig. 3, it will be seen that a spring 21 is secured to the base plate 1 at one end of the spring and that the other end of the spring bears against the timer, to prevent its displacement from the shaft 2. The rails 17 are the opposite sides of a frame 22 which is arranged within the slot 16 of the base, the said frame being in the form of a loop which is secured to the base. The keyway 5 in the shaft 3 which is adapted for engaging the driving shaft for the timer has an inclosed socket, as shown, so that the key cannot drop out.

The device is supported by brackets 23, as shown in Fig. 1. In order to remove the timer the spring 21 is released. It will be noticed that this spring is held by a thumb screw so that the tension on the timer may be adjusted.

I claim:

1. In combination with the timer of an internal combustion engine and the time shaft, of a support having journaled at each end thereof a shaft, one shaft having means for engaging the timer shaft and the other being adapted for connection with the timer brush, a driving connection between the shafts for constraining them to rotate in opposite directions, said connection comprising crank arms on the shafts oppositely arranged, a link connecting the arms, and a roller journaled on the link at the center thereof, the supporting plate having a longitudinally extending slot in which the roller moves, and a hood inclosing the plate having tubular extensions for the timer shaft and timer.

2. In combination with the timer of an internal combustion engine and the timer shaft, of a support having journaled at each end thereof a shaft, one shaft having means for engaging the timer shaft and the other being adapted for connection with the timer brush, a driving connection between the shafts for constraining them to rotate in opposite directions, and an inclosing hood for the plate, said hood having tubular extensions for the shaft and timer.

3. In combination with the timer of an internal combustion engine and the timer shaft, of a support having journaled at each end thereof a shaft, one shaft having means for engaging the timer shaft and the other being adapted for connection with the timer brush, and a driving connection between the shafts for constraining them to rotate in opposite directions.

4. In combination with the timer of an internal combustion engine and the timer shaft, of a support having journaled at each end thereof a shaft, one shaft having means for engaging the timer shaft and the other being adapted for connection with the timer brush, a driving connection between the shafts for constraining them to rotate in opposite directions, said connection comprising crank arms on the shafts oppositely arranged, a link connecting the arms, and a roller journaled on the link at the center thereof, the supporting plate having a longitudinally extending guide in which the roller moves.

HUBERT ZINS.